United States Patent [19]
Kittel

[11] Patent Number: 4,834,275
[45] Date of Patent: May 30, 1989

[54] APPARATUS FOR ACTING ON GLASS SHEETS

[76] Inventor: Florenz Kittel, 5102 Würselen, In den Pützbenden 18, Fed. Rep. of Germany

[21] Appl. No.: 66,578

[22] Filed: Jun. 26, 1987

[30] Foreign Application Priority Data

Jun. 27, 1986 [DE] Fed. Rep. of Germany ....... 3621640

[51] Int. Cl.4 .............................................. C03B 33/04
[52] U.S. Cl. ...................................... 225/97; 225/96.5
[58] Field of Search ........................... 225/97, 96.5, 2

[56] References Cited

U.S. PATENT DOCUMENTS

| | | | |
|---|---|---|---|
| 4,151,940 | 5/1979 | Nuding et al. | 225/96.5 |
| 4,371,103 | 2/1983 | Siemens et al. | 225/97 X |
| 4,698,088 | 10/1987 | Bando | 225/96.5 X |

Primary Examiner—Frank T. Yost
Assistant Examiner—Hien H. Phan

[57] ABSTRACT

A device for breaking off edge strips from a blank, within which model glass sheets of present shape are scratched. The breaking off edge operation takes place with the aid of pressure pins, placed on a carrier plate arranged parallel to glass sheets. The pressure pins are adapted to be lowered onto the edge strips which are to be broken off. The plurality of pressure pins are located on the carrier plate in a broad arrangement covering various sizes and shapes of the glass sheets. Each individual pressure pin, independently of the neighboring pressure pins can be moved from its retracted rest position into its lowered working position as a function of the shape and size of the respective glass sheet. The pressure pins may be operated by pneumatic cylinders controlled in accordance with a program allocated in each case to the glass sheet to be processed. The invention permits control of a breaking off device for molded glass sheets according to a preset program. The device may be used in the application of locally acting pressure forces on a glass sheet, such as auto glass sheets within a production line.

14 Claims, 5 Drawing Sheets

APPARATUS FOR ACTING ON GLASS SHEETS

TECHNICAL FIELD

The invention relates to apparatus for acting on glass sheets. In particular, the invention relates to apparatus or a device for applying locally acting mechanical pressure forces on a glass sheet by action of pressure pins placed on a carrier plate. The carrier plate is disposed in a position parallel to the glass sheet, and the pressure pins are disposed in alignment perpendicular to the glass sheet for movement from a retracted rest position into a lowered working position. The apparatus may function in a manner to break off the edges from a blank around a model glass sheet, as well as to provide a capability of alignment of model glass sheets.

BACKGROUND OF THE INVENTION

Apparatus for breaking off the edge strip of a glass sheet scratched in a blank according to some predetermined contour is known in the prior art. Representative of the prior art is U.S. Pat. No. 4,371,103 to Selmens. According to the patent, pressure pins which are placed apart at short distances from one another are lowered onto a glass sheet disposed therebelow. This action is carried out as the glass sheet resides on a flexible elastic support in a manner that a greater surface pressure is brought to bear on the edge strips outside of the contour line than on the glass sheet inside the contour line. Quite obviously the pressure forces exerted by the pressure pins must act on different points, and the locations of action will be different for glass sheets of different shape and size. Normally, the pressure pins are arranged in a known arrangement in the same housings on a common carrier plate and for purposes of changing the points of the action of the pressure forces exerted by the pressure pins, the housings are mounted in slidable fashion on a common carrier plate. To adjust the points of action of the pressure pins for operating on glass sheets of different size and shape it is necessary to detach the housings carrying the groups of pressure pins from the carrier plate and, then, refasten the housings on the carrier plate at another location. This changeover operation of the apparatus to accommodate another glass sheet shape or another glass sheet size requires an interruption in production. Because the changeover operation requires a certain amount of time, and is carried out by hand, there is a loss of production output and a loss financially.

SUMMARY OF THE INVENTION

It is a principal aspect of the invention to improve upon the overall operation of such apparatus so that any change in glass sheet size and/or glass sheet shape arriving at a break off station may be accommodated without manual relocation of the pressure pins. Further, the apparatus of the invention is capable of complete automation of a glass processing line.

The principal aspect of the invention is attained by implementation of a carrier plate and a plurality of pressure pins supported by the carrier plate. The pressure pins, preferably, are distributed throughout the entire area of the carrier plate in a regular gridwork comprising a broad arrangement of pressure pins covering various sizes and shapes of glass sheets. Further, each individual pressure pin, independently of neighboring pressure pins, may be moved from a retracted rest position into a working position as a function of the shape and size of the respective glass sheet moving to or residing at the break off station.

In a useful development of the invention, the pressure pins may be controlled individually or in any arrangement in accordance with a program allocated to a particular glass sheet to be worked. The program may be stored in a data carrier. Thus, it is possible to fully automate the apparatus and activate a selection or configuration of the pressure pins to accommodate glass sheets of any shape and size. The pressure pins to be activated, as necessary for the respective sheet shape and sheet size, is determined beforehand and stored in a corresponding program. Either before or after a glass sheet enters the break off station the required pressure pins are activated in accordance with the new program.

In a first form of the invention, the carrier plate which supports the pressure pins is disposed stationarily within the break off station, parallel to the glass sheet. In this form of the invention, the pressure pins move from a retracted rest position to a lowered working position for exerting pressure forces during movement.

According to a second form of the invention, the carrier plate is similarly located with respect to the glass sheet and the pressure pins are similarly movable in directions transverse to the plane of the carrier plate. The carrier plate, however, is also slidable, and the pressure forces are exerted by the movement of the carrier plate in the direction perpendicular to the glass sheet. In this form of the invention, before movement of the carrier plate in the direction perpendicular to and against the glass sheet, it is possible to locate the pressure pins in a working position according to either the preset distribution or preset program. This form of the invention may be successfully used in a breaking off station for breaking off the edges from a model glass sheet.

The apparatus of the invention may be otherwise employed. To this end, for example, the apparatus may be used for alignment of glass sheets within a processing line. In this case, at least a carrier plate with pressure pins arranged in a gridlike arrangement for individual activation is mounted to be slidable in a direction parallel to the glass sheet. Proper pressure pins within the gridlike arrangement are each moved to their working position prior to movement of the glass sheet. These pressure pins, then, are in position to act on one or more peripheral surfaces of the glass sheet to shove or force the glass sheet into a desired position upon movement of the carrier plate.

Further developments and advantages of the invention will be seen as the description of the forms of the inventions continues, and by reference to the accompanying drawings.

BEST MODE FOR CARRYING OUT THE INVENTION

Figure 1:
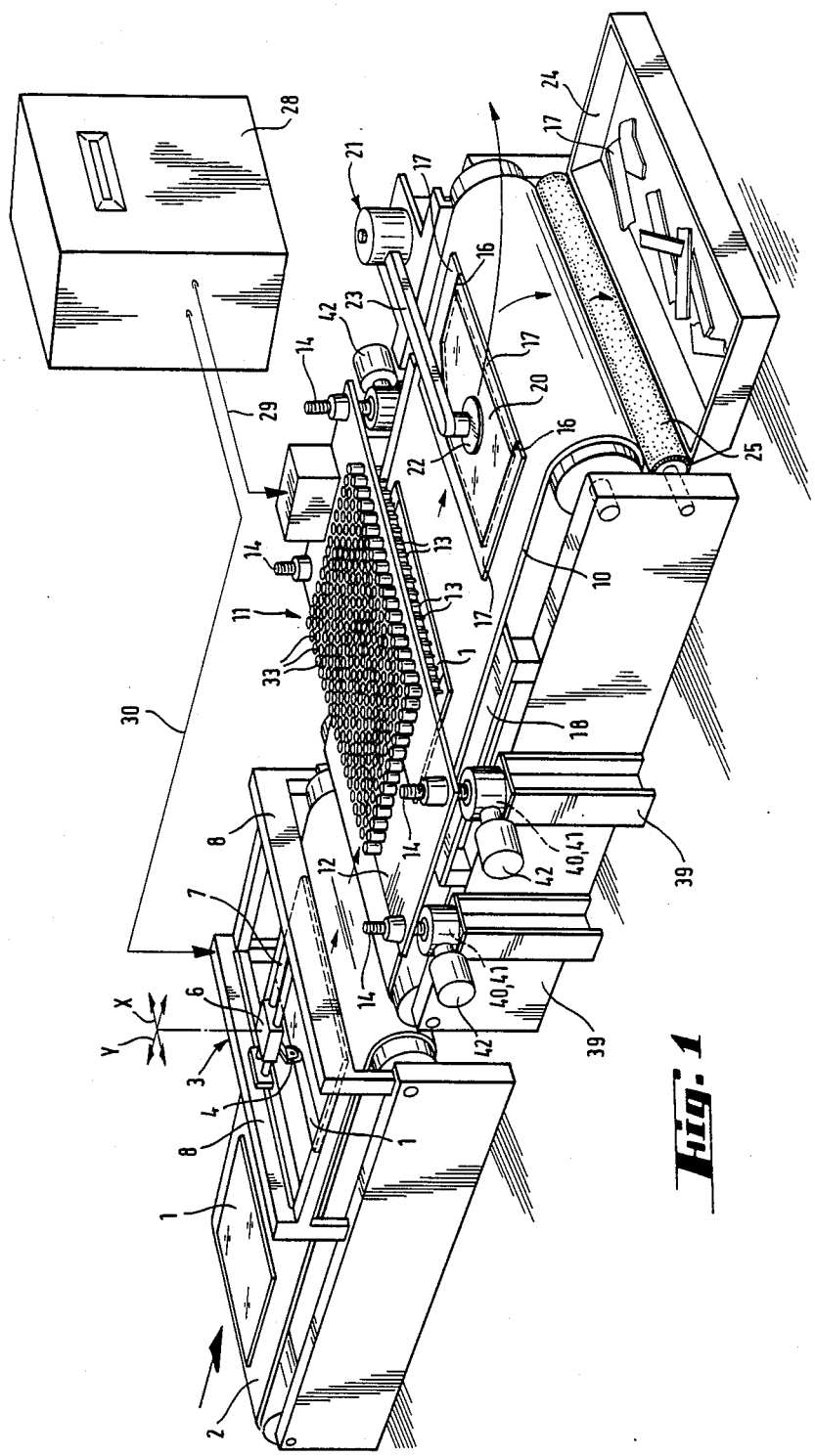
FIG. 1 is a perspective view of a production line for model cutting including a station for breaking off a glass sheet.

Referring to FIG. 1, there is a view of a production line for model cutting and a downstream station for breaking off a glass sheet. The breaking off station, according to the invention, will be described in detail as the description continues. In general, the production line includes apparatus in the form of a conveyor 2 including a belt and rollers which entrain the belt for movement of a blank 1 in the direction of the arrow (shown at the left of the production line) toward a cutting machine 3. The cutting machine operates automatically to apply a cutting line to the blank corresponding to the desired shape of a glass sheet to be prepared. Normally the blank 1 which is conveyed to the automatic cutting machine will be rectangular in outline. The cutting machine includes a cutting tool 4 supported on a carriage 6. The carriage, in turn, is supported by a bridge 7 for movement in one direction within an X-Y coordinate axis, and the bridge is supported on rails 8 for movement in the other direction within the X-Y coordinate system. The carriage is program-controlled, and the program-controlled cross carriage/automatic cutting machine may be provided with a linear motor drive for each of 20 the carriage and bridge along the respective axes as described, for example, in U.S. Pat. NO. 4,371,103 to Siemens.

After blank 1 is provided with the cutting line, the blank is transferred from conveyor 1 to conveyor 10. Conveyor 10 connects with conveyor 1 in a longitudinal downstream direction as illustrated in FIG. 1. As also illustrated, conveyor 10 is formed similarly to conveyor 1. Movement of blank 1 along conveyor 10 comprises a feed to a breaking off station and an automatic breaking off device 11.

Figure 2:
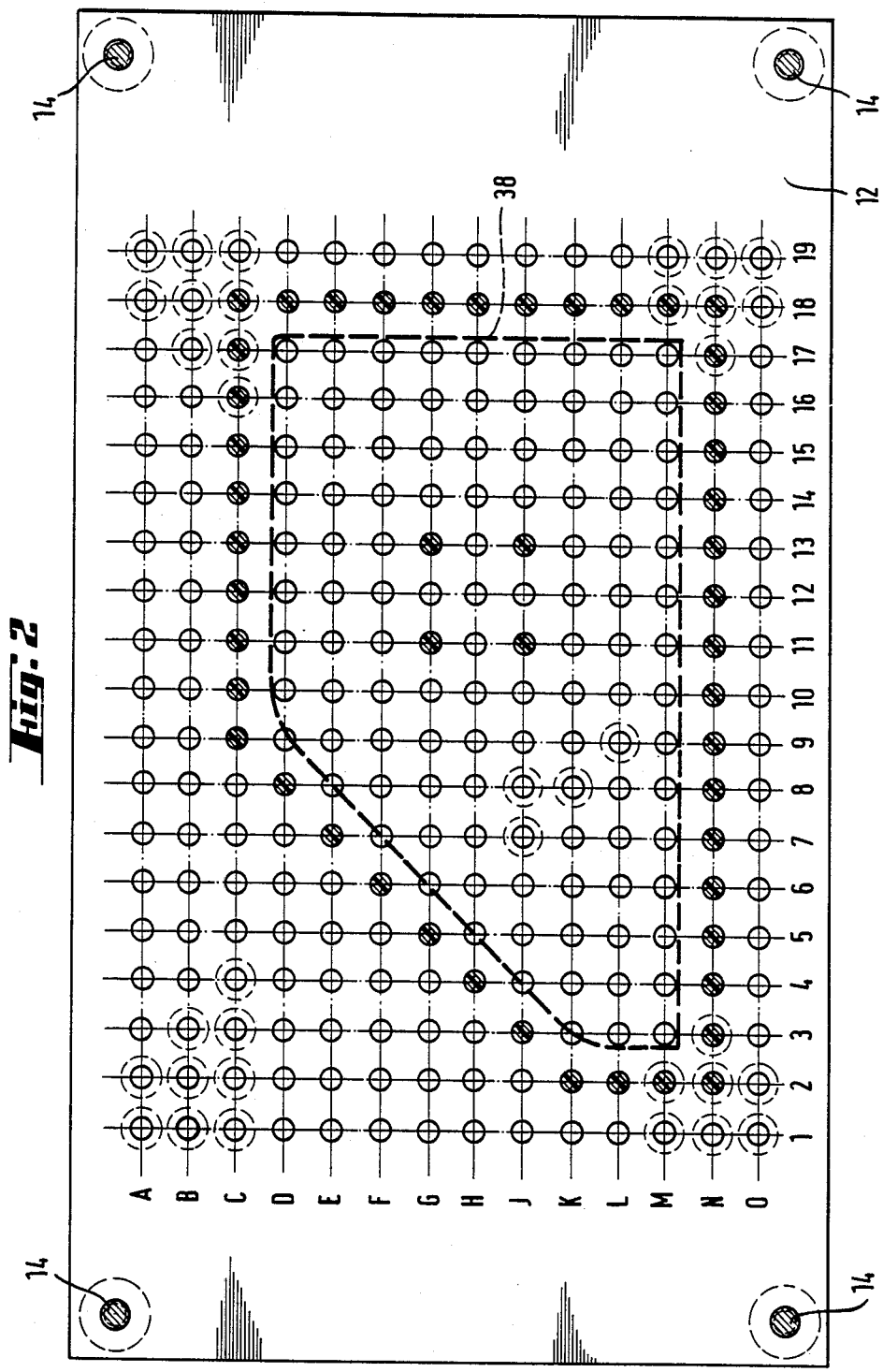
FIG. 2 is bottom view of a carrier plate provided with a grid of pressure pins defining a breaking off station along the production line illustrated in FIG. 1.

Breaking off device 11 comprises a carrier plate 12 and a plurality of pressure pins 13 supported by the carrier plate in a gridlike arrangement. The carrier plate, located above conveyor 10, is mounted by several lifting spindles 14 for movement between positions relative to the upper run of the conveyor. More particularly, the carrier plate is mounted by four lifting spindles, and movement of the carrier plate is vertically between positions close to and spaced from the upper run of the conveyor. During periods that the carrier plate is stationary and as it undergoes movement it remains parallel to the upper run of the conveyor. The mounting of the carrier plate may also be seen in FIG. 3, and the carrier plate, as seen from the bottom is illustrated in FIG. 2. In operation, after positioning of the carrier plate, selected pressure pins of the total number of pressure pins are activated, i.e., brought from a retracted rest position into a lowered working position. Thus, during the breaking off process the pressure pins that are moved come in contact with the blank in the region or regions of a cutting line while all of the remaining pressure pins within the gridlike arrangement remain out of contact with the blank.

The cutting tool 4, see FIG. 1, is illustrated in position to provide a cutting line across blank 1 in a direction transverse to the direction of movement of the blank. Optionally, an auxalary cutting device(s) (not shown) may be located in the cutting machine 3 or in breaking off device 11. The auxiliary cutting device(s) provide the blank with an auxiliary cut 16 in edge strip !7 to facilitate breaking off each edge strip.

Figure 3:
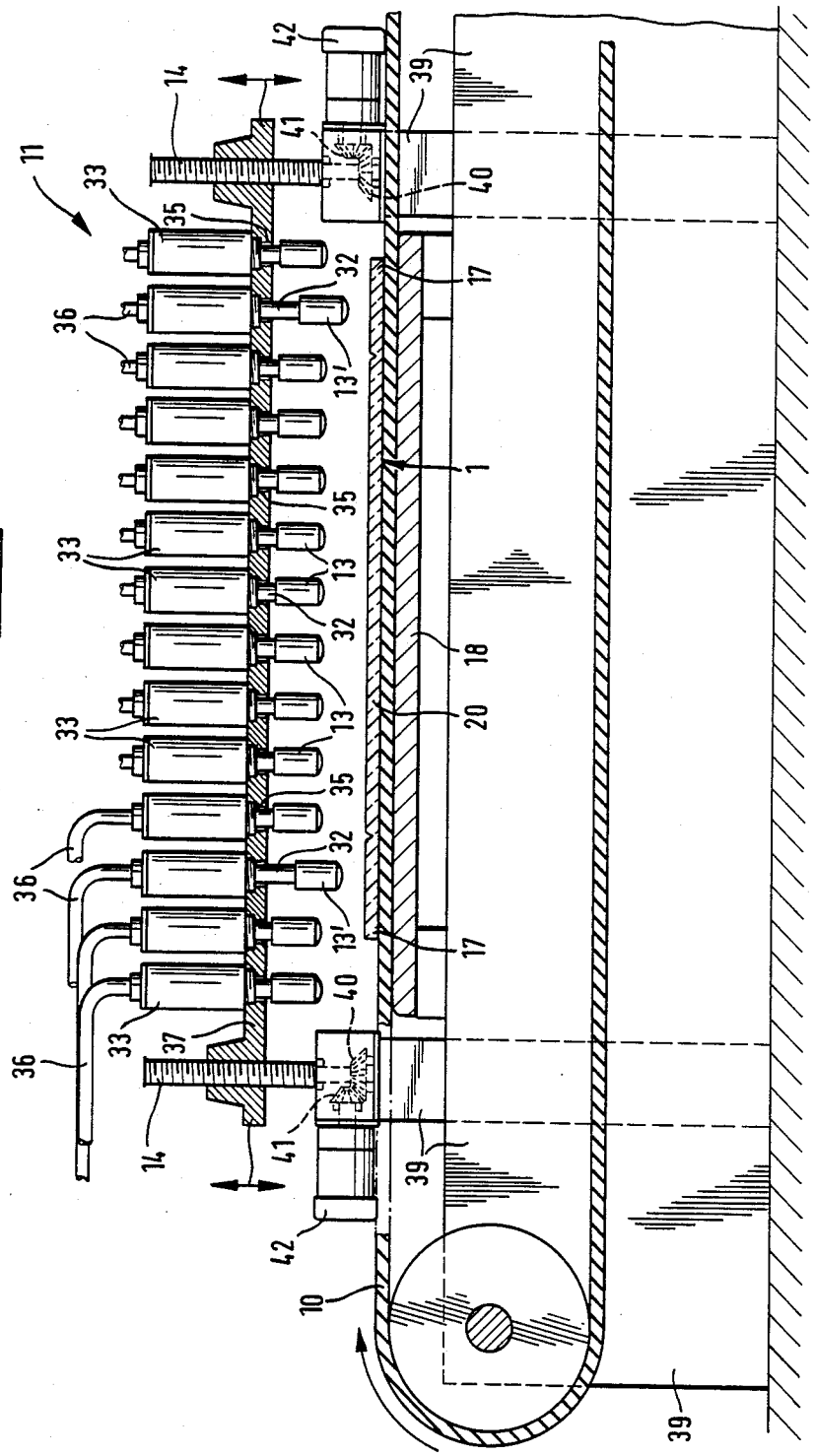
FIG. 3 is a side view of a first embodiment of a breaking off station according to the invention.

The material of conveyor belt 10 provides an elastic flexible surface for the blank and model glass sheet to be formed. As illustrated in FIGS. 1 and 3, the conveyor belt slides over a table plate 18 which preferably may be a metal plate with a smooth, solid surface.

After the conclusion of the breaking off process, the model glass sheet 20 within the edge strips 17 that are broken off is removed from conveyor 10. This action takes place at an unloading station 21 at the end of the run of conveyor 10. The unloading station is defined by a suction disk 22 at the end of an arm 23 swingable about a pivot toward another production line or a conveyor frame. Movement follows gripping of the model glass sheet by the suction disk. The edge strips 17 broken from the model glass sheet fall from conveyor belt 10 to a collecting tray 24. A cleaning roller 25 frees any possibly adhering glass splinters from the belt of conveyor 10 prior to a return run.

Figure 4:
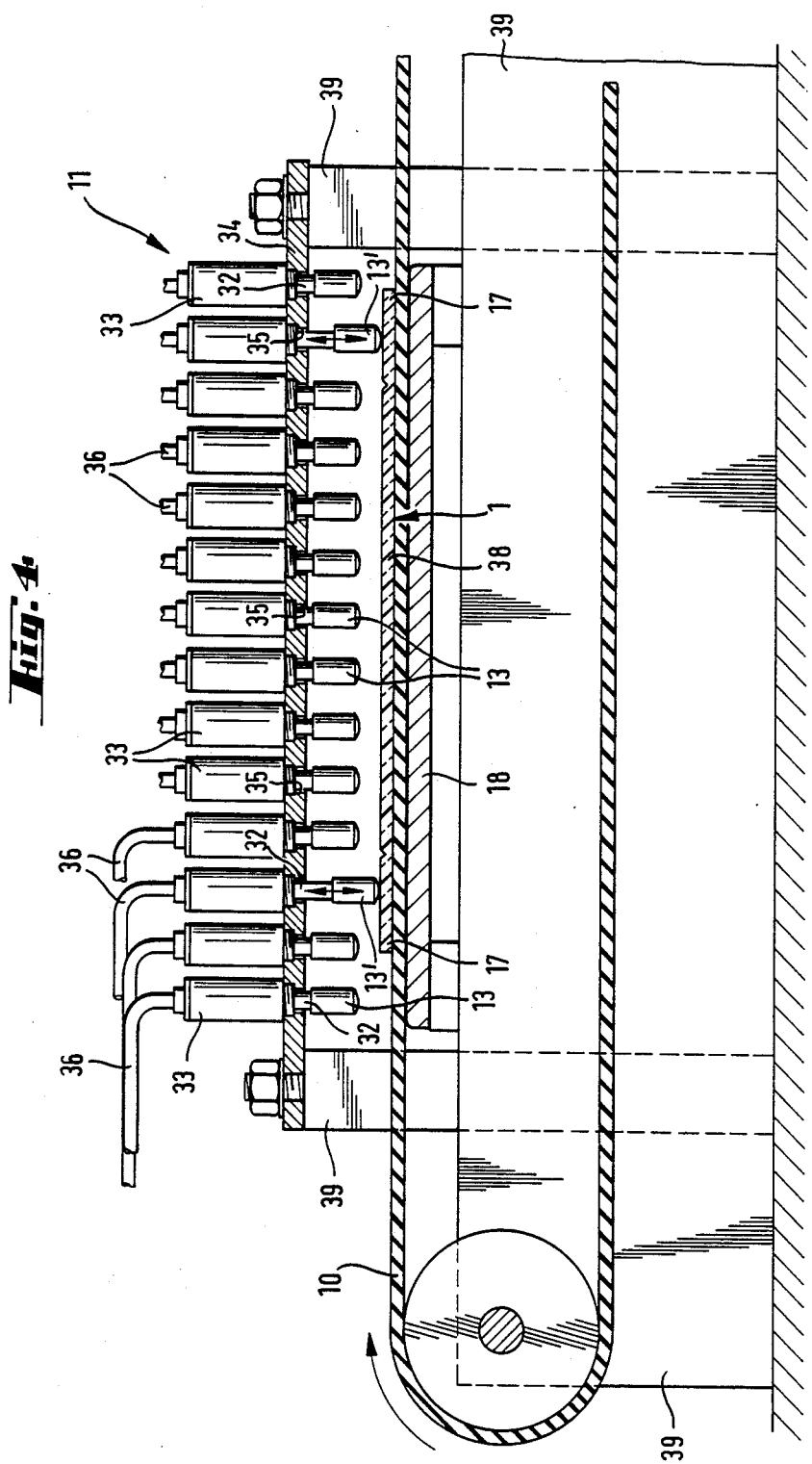
FIG. 4 is a side view of a second embodiment of a breaking off station according to the invention.

Operation of carrier plate 12 and pressure pins 13 will become clear through the following discussion and reference to FIGS. 2–4.

As indicated, carrier plate 12 is provided with a regular gridwork of pressure pins 13 adapted to be activated and controlled individually in any manner of selection. The control is provided in each case from a control cabinet 28 over control line 29. The control cabinet also controls cutting machine 3 over control line 30. The control program for cutting machine 3 and breaking off device 11 in automatic operation corresponds to one another, i.e., for each cutting program a particular program is necessary for the automatic breaking off machine. Both programs, however, can be stored in a common data carrier, so that the control lines for the operations are controlled by a single data carrier.

Pressure pins 13 may be activated in substantially any manner, pneumatically, hydraulically or electrically. FIGS. 3 and 4 illustrate a pneumatic operation for each pressure pin. Each pressure pin may comprise a plastic pin mounted at the end of a rod 32 extending from a pneumatic cylinder 33. Each cylinder is mounted on carrier plate 12 (34) in the aforementioned gridlike arrangement so that the piston rods which penetrate bores 35 in the carrier plate move along vertical axes. A pressure line 36 connects each pneumatic cylinder to a solenoid valve (not shown) controlled with the aid of the program control.

Turning to FIG. 2, fabrication of model sheet 38, represented by the dashed lines, requires operation of pressure pins C9 to C18, 18D to 18M, N2 to N18, 2M to 2K, J3, H4, G5, F6, E7 and D8 for breaking off the edge strips 17 of the blank. In addition, pressure pins G11, G13, J11 and J13 located approximately concentrically of the blank are also operated for purposes of stabilization and holding the blank to the surface of conveyor 10.

The design of the pressure pin gridwork and the control of the pressure pins are basically the same in each of the two embodiments of break off device illustrated in FIG. 3 and FIG. 4. In the embodiment of FIG. 4, carrier plate 34 is rigidly fastened to machine frame 39, and breaking off the edge strips 17 from model sheet 38 takes place after positioning the blank by lowering selected pressure pins 13' by pressurization of the appropriate pressure cylinders with pressurized air. On the other hand, in the embodiment of FIG. 3, corresponding to the structure illustrated in FIG. 1, carrier plate 34 is adapted to be raised and lowered. To this end, the carrier plate is mounted on lifting spindles 14 which rotate in machine frame 39. An electric motor 42 imparts rotation to the lifting spindles through bevel gears 40, 41. In this case, pressure pins 13', selected for breaking off edge strips 17 are activated in the manner of activation of pressure pins 13' of FIG. 4 to their lower working position before the breaking off process commences. The breaking off process commences after positioning of the blank upon activation of motor 42. Thus, the motor, through the bevel gear drive to spindles 14, causes a lowering of carrier plate 34 and a resultant action of pressure pins 13' already in their working position against edge strips 17.

Figure 5:
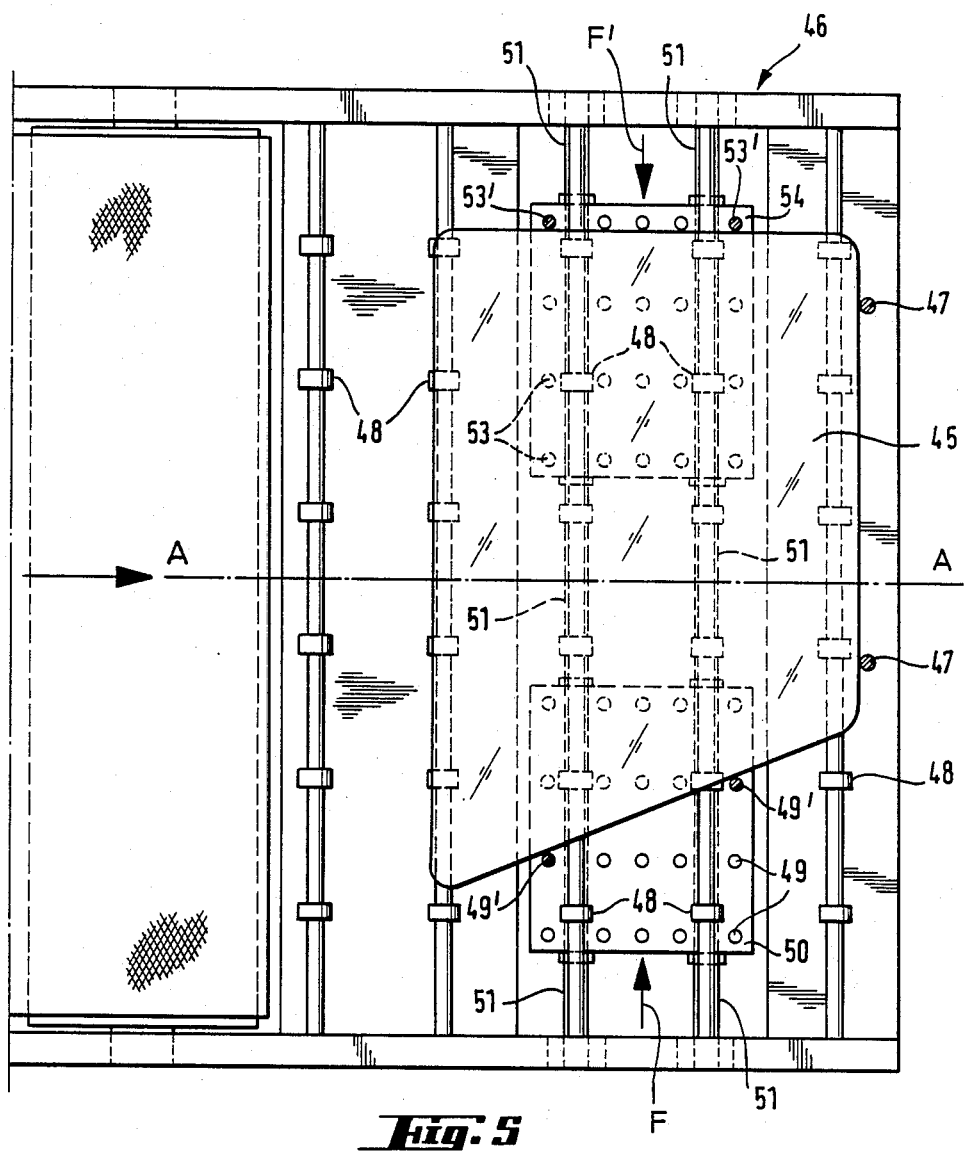
FIG. 5 is a plan view of an alignment station within a production line including positioning device for glass sheets according to the invention.

Reference may now be taken of FIG. 5 which illustrates structure for positioning a model glass sheet at a work station or on a conveyor. In the FIG. the glass sheet 45 is of trapezoidal outline. The glass sheet is to be positioned at an alignment station 46 the configuration of which, according to the invention, permits alignment of glass sheets of various shapes and sizes. The alignment operation along the production line can be programmed without any manual action being necessary.

The positioning of glass sheet 45 takes place with the aid of stops acting on the side edges of the glass sheet. The stops within alignment station 46 are mounted to slide in the directions of arrow F or F¹ to move the glass sheet into the desired position as the front edge of the glass sheet moves into a downstream position as determined by stop 47. These actions take place as the glass sheet is supported in conveyor rollers 48 for movement in the direction A, to a rest position at stops 47.

The stops which act on the side edges of the glass sheet comprise pressure pins, selected ones of which are activated, i.e., moved from an inactive rest position to an active working position, as previously discussed. Pressure pins 49 on one side of the alignment station are located on a carrier plate 50, while pressure pins 53 on the other side of alignment station are located on a carrier plate 54. Both carrier plates are adapted to slide on slide bearings along slide rails 51 in the directions F, F' and define movable carriages. Movement of the carriages is controlled by cylinder (not shown), which, in turn, is controlled from a central control unit. The pressure pins 49, 53 are placed on the respective carrier plates 50, 54 in a regular grid symmetrical to center axis A—A of the alignment station.

The sliding carrier plates 50, 54 are disposed below the plane of the glass sheet undergoing movement and spaced from the glass sheet so that the pressure pins in their rest position are out of contact with the glass sheet. In an alignment operation, pressure pins 49' and 53' are moved to their working position and are, therefore in position to act on the edges of the glass sheet. This may be seen in FIG. 5. These pressure pins are situated in positions corresponding to the shape and size of glass sheet 45 and selected so that present movement of carrier plates 50, 54 will achieve a desired positioning of the glass sheet.

Pressure pins 49, 53 may be activated in substantially any manner. For example, the pressure pins may be controlled by a pneumatic or hydraulic cylinder, electrically or by an electromagnet. Activation of selected pressure pins is automatic and carried out as a function of the shape and size of each glass sheet to be positioned. Particularly, activation of selected pressure pins is possible according to a present control program which also controls other functions within the processing line.

What is claimed is:

1. Apparatus for local application of pressure to a glass sheet within a production line for glass sheets, comprising means for supporting a glass sheet, a carrier plate disposed substantially parallel to the means for supporting a glass sheet, and a plurality of pressure pins mounted on and substantially perpendicular to said carrier plate in a regular array, each pressure pin being independently controlled for movement between a retracted rest position and a lowered working position, as a function of the shape and size of the respective glass sheet.

2. The apparatus according to claim 1, wherein said pressure pins are mounted on said carrier plate in the form of a substantially rectangular array.

3. The apparatus according to claim 1 further including means for activating said pressure pins to move said pins from said rest position to said working position, said activating means adapted to controllably activate individual ones of said pressure pins.

4. The apparatus according to claim 3, wherein said activating means adapted to controllably activate individual ones of said pressure pins comprises a pneumatic cylinder activating each pressure pin individually.

5. The apparatus according to claim 4 wherein said pneumatic cylinders are controlled by a program corresponding to the particular glass sheet to be processed.

6. The apparatus of claim 3, wherein said means for activating said pressure pins comprises a hydraulic cylinder activating each pin individually.

7. The apparatus of claim 3, wherein said means for activating said pressure pins comprises an electromagnet activating each pin individually.

8. The apparatus according to claim 1 wherein said carrier plate is fixed with respect to said means for supporting a glass sheet and wherein said pressure forces are exerted locally on said glass sheet by the pressure pins during their movement from said retracted rest position to said lowered, working position to break the glass sheet along a cutting line.

9. The apparatus according to claim I wherein said carrier plate is movable with respect to said means for supporting a glass sheet in a direction perpendicular to the glass sheet, wherein said pressure forces are exerted locally against the glass sheet to break the glass sheet along a cutting line, by movement of said carrier plate, selected ones of said pressure pins having previously been lowered to their working position.

10. An apparatus according to claim 1, adapted to be used for positioning a glass sheet disposed on a horizontal support means, wherein said carrier plate is movable transversely with respect to said support means and said carrier plate carries said pins for engagement with the edges of said glass sheet.

11. The apparatus of claim 10 wherein plural transversely movable carrier plates are provided.

12. The apparatus of claim 11, further comprising means for individually activating said pins carried by said carrier plates responsive to the outline of the glass sheet to be positioned.

13. The apparatus according to claim 1, in combination with a common central control unit in a production line for auto glass sheets, wherein said central control unit activates said pressure pins as a function of the shape and size of the respective glass sheets, and also controls other processing procedures within the production line.

14. The apparatus according to claim 13 wherein said common central control unit comprises storage means for storing control signals for the activation of individual pressure pins and other processing procedures.

* * * * *